United States Patent [19]

Wettstein

[11] Patent Number: 4,651,435
[45] Date of Patent: Mar. 24, 1987

[54] COMPOUND SINE BAR AND METHOD OF SETTING AN ANGLE IN A LATHE

[76] Inventor: James Wettstein, 70 Lincoln St., East Hanover, N.J. 07936

[21] Appl. No.: 869,284

[22] Filed: Jun. 2, 1986

[51] Int. Cl.⁴ ............................. G01B 3/18; G01B 3/30
[52] U.S. Cl. ..................................... 33/536; 33/185 R
[58] Field of Search ...................... 33/536, 185 R, 534, 33/1 N

[56] References Cited

U.S. PATENT DOCUMENTS

| | | |
|---|---|---|
| 646,499 | 4/1900 | Lodge . |
| 1,169,928 | 2/1916 | Commons . |
| 1,476,573 | 12/1923 | Allen . |
| 2,190,455 | 2/1940 | McCollum et al. . |
| 2,345,708 | 4/1944 | Lines . |
| 2,351,773 | 6/1944 | Lovenston . |
| 2,429,517 | 10/1947 | Knapp . |
| 2,442,136 | 5/1948 | Luther . |
| 2,511,443 | 6/1950 | McDowell . |
| 2,589,489 | 3/1952 | Fuhr ................................ 33/536 X |
| 2,609,612 | 9/1952 | Mull . |
| 2,645,067 | 7/1953 | Hinderer . |
| 2,649,785 | 8/1953 | Sirko . |
| 2,710,454 | 6/1955 | Kershaw . |
| 2,889,757 | 6/1959 | Cole . |
| 3,389,473 | 6/1968 | O'Connor ....................... 33/536 X |
| 3,406,458 | 10/1968 | Welch . |
| 3,423,885 | 1/1969 | Crandall ......................... 33/536 X |
| 3,432,934 | 3/1969 | Schmidt . |
| 4,389,785 | 6/1983 | Goldsmith et al. ................ 33/536 |

FOREIGN PATENT DOCUMENTS 278353 11/1970 U.S.S.R. .

Primary Examiner—William D. Martin, Jr.
Attorney, Agent, or Firm—Martha G. Pugh

[57] ABSTRACT

This discloses an improved sine bar for accurate measurement of angles for machining operations, and methods of its use. This comprises a rectangular elongated base member, projecting from opposite ends of which are cylindrical connecting rods. A conforming reference bar is hingedly connected to the base member, and has a cylindrical bearing pin fastened beneath one end. When the sine bar is open to accommodate one or more calibrated gauge blocks, a spring-biased chain keeps the gauge block(s) in position between the base member and the bearing pin. A recess in the base member permits measurement of small angles. This device is especially adapted for use in setting up a lathe compound to calibrated angular positions, but is also useful for other types of milling and machining operations in which the sine bar rests on a flat surface.

7 Claims, 8 Drawing Figures

COMPOUND SINE BAR AND METHOD OF SETTING AN ANGLE IN A LATHE

BACKGROUND OF THE INVENTION

This relates in general to devices for accurately measuring and checking angles, more particularly to sine bars and their methods of application to the machining of metal parts.

A sine bar is a device for measuring angles to a high degree of accuracy, which comprises one or more bars accommodating a pivot pin at one end and a bearing pin at the other end. The flat surfaces of the bar are ground to a high degree of accuracy, the distance between the tangential bearing points of the pivot pin and the bearing pin being accurately spaced-apart to form a hypotenuse (h) of preselected length when the bar is supported on a flat surface, or has a flat supporting bar, from which the reference bar is rotated about the pivot pin to form an angle. Precisely dimensioned gauge blocks are interposed beneath the bearing point at the open end, permitting accurate measurement of the subtended angle by the conventional formula sine $O = a/h$, where "a" is the height of the interposed gauge block and "h" is the length of the hypotenuse.

This principal is the basis of a prior art sine bar in wide use, comprising a single reference bar for use in conjunction with a flat base, and also, of an improved device entitled "Sine Bar For Lathe Attachment" disclosed in Russian Inventor's Certificate No. 278,353 granted to Kilin G.I. Glukhov on May 8, 1970.

The single element sine bar commonly used in the prior art cylindrical grinders, and other spindle-type machines to set a compound or a headstock accurately to a desired angle.

The problem with the improved model of the type disclosed in the Russian Inventor's Certificate to Glukhov is that the cylindrical body portion of the base member is strictly limited to cylindrical applications and cannot be used on flat surfaces, such as in milling, surface grinding, granite surface plates, and other similar applications. Moreover, it can only be mounted on spindle-type machines by using axially aligned centers at opposite ends of the bar, which limits the device to specific orientations, and thus, to specific applications. Glukhov's device is not designed to be mounted on a lathe by means of a collet or chuck at either end of the body, which limits its versatility, as it must always be mounted between centers.

Moreover, the Glukhov device and other prior art sine bars are not applicable to the measurement of very small angles, inasmuch as the height of the smallest gauge block which can be used is limited.

Furthermore, in the Glukhov device the gauge blocks are secured in place by tightening a nut at the pivot end, which distorts the measurement being made by changing the pressure within the reference sine bar.

Accordingly, it is the object of this invention to improve the accuracy of sine bar measurement by making certain improvements in the sine bar apparatus and the method of using the same.

More particular objects of the invention are to improve the accuracy of sine bar measurements, and the facility with which the sine bar can be used to perform many different types of measurements during lathe operations and other types of machining operations, as well as on milling machine tables, or other types of flat surfaces.

These and other objects are realized with the compound sine bar of my improved design and the disclosed methods of using the same. This comprises a flat reference bar having bearing means at opposite ends to accommodate a pivot pin at one end and a bearing pin at the other end. I have added a base member of substantially rectangular section hinged to the reference bar about the pivot pin, which permits the sine bar to rest on a flat surface. In addition, I have added to the two ends of the base member a pair of tailstock shaft extensions centered and protruding outwardly from opposite ends of the long axis of the base member which permit the base member to be mounted accurately into the collet of a conventional type of lathe, from either or both ends, or alternatively, to be mounted between centers. Since using the centered mounting members is optional, the operator is able to mount my improved sine bar in fixtures on milling machines, surface grinders and other equipment types having flat surfaces, where centers are not available and not practical.

Further, the base member of the sine bar of my design is provided with a recess on its upper surface which is based 0.100 inch below the horizontal plane of the tangential contact of the pivot pin, thereby enabling the use of supplemental blocks for the measurement of angles which are too small to be measured with prior art types of sine bars.

In accordance with another improvement, I employ a simple spring-biased chain arrangement fastened across the open angle between the reference bar and the base for holding the gauge blocks in place, thereby removing the necessity for tightening a nut at the pivot point, and thereby assuring the accuracy of sine bar angular setting.

In accordance with my improved method of using my sine bar to set up angles on a lathe compound, my sine bar is adjusted to the desired angle by interposing one or more gauge blocks, which are locked in place by the tension of the spring and chain. The tailstock shaft connection of my compound sine bar is then interposed into the collet of a lathe, where it is rotated to a desired position with its lateral surfaces in a horizontal position, as tested by a parallel flatstock bar placed across them. An indicator gauge is moved across the parallel flat stock bar to make sure the reference surface of the sine bar is parallel with the surface of the compound slide bar of the lathe compound. The lathe compound is then turned in a horizontal plane until a visual check shows the compound slide bar to be parallel to the reference surface of the sine bar. The parallel relationship between the two is then checked by mounting the gauge on the compound slide bar and moving the probe over the reference surface. If the gauge needle does not move, the two are deemed to be exactly parallel, and the position of the compound slide bar of the lathe is locked in place, being set up precisely to the desired tolerance; otherwise, the process is repeated. The sine bar is then removed from the lathe collet and replaced by the workpiece to be machined.

The compound sine bar of the present invention can be used in conjunction with cylindrical grinders and other spindle-type machines, as well as lathes, without the necessity of being mounted between centers. No device is available in the prior art for performing all of these functions. In addition, because of the rectangular shape of the base, the compound sine bar of the present invention can be supported on a flat surface to make measurements in the manner of prior art sine bars.

Other objects, features and advantages of the invention will be understood from a study of the attached drawings and detailed description of the invention hereinafter.

SHORT DESCRIPTION OF THE DRAWINGS

DETAILED DESCRIPTION OF THE INVENTION

Figure 2:
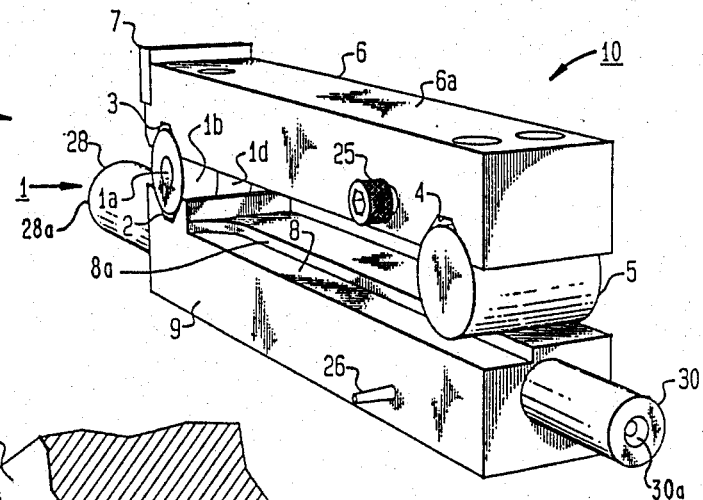
FIG. 2 is a perspective showing of the base and reference bars of a compound sine bar in accordance with the present invention, in closed position.

Referring to FIG. 2 of the drawings, there is shown the compound sine bar 10 of the present invention, which comprises a base member 9 on which is superposed a reference bar 6.

The base member 9, which is of generally rectangular section, is 6 inches long, and 1 inch wide at its base, and has an overall thickness of ¾ inch from its forward end to within ¾ inch of the rear end, where it terminates in a vertical step 9a, which projects ⅛ inch above the upper surface of 9. This forms the outer wall of an integrally formed bearing 2. The opposite interior walls of which are each angled inwardly at about 45 degrees, forming between them a surface of frusto-triangular section, having centered along its interior a flat strip ⅛ inch wide and 1 inch long.

The upper surface of block 9 has a flat, recessed area 8 forming a strip ⅜ inch wide along one edge extending from the forward end 5¼ inches to the step 9a, which is bounded longitudinally by the step 8a which is precisely 0.1000 inch high.

Centered coaxially and extending out in opposite directions horizontally from the two ends of the base member 9 are shafts 28 and 30 which respectively serve as headstock and tailstock connectors. The headstock connector 28 is ¾ and tailstock connectors. The headstock connector 28 is ¾ inch in diameter and 2 inches long; and the tailstock connector 30 is ½ inch in diameter and 1 inch long. Each of these has at its end a central depression 28a, and 30a, respectively, for the option of mounting between centers.

Reference block 6, of overall rectangular cross-section, is 6 inches long, 1 inch wide, and ¾ inch thick, and terminates at its rear end in a stop plate 7, ½ inch wide and 1 inch long and ¼ inch thick. The latter fits flush with the end of block 6, and extends ⅛ inch in a vertical plane above the surface 6a of reference block 6.

Cut transversely across the under surface of block 6, near its opposite ends, are a pair of bearing surfaces 3 and 4, the internal angular shapes and dimensions of which are substantially similar to those of the bearing 2. The distance between a pair of vertical planes passing through the centers of the internal bearing surfaces 3 and 4 normal to the longitudinal axis of bar 6 is precisely 5 inches, to a tolerance of 0.0002 inch.

It will be understood that the components of the compound sine bar and gauge blocks of the present invention are manufactured from high grade tool steels the surfaces of which are machined, hardened, and accurately ground to a minimum tolerance of 0.0002.

The cylindrical pivot-hinge complex 1, which is 1 inch in overall length and ⅝ inch in outer diameter, has a cylindrical inner core 1a which is 5/16 inch in diameter and 1 inch long. This is accommodated in rotatable axial relation through the three annular hinge members 1b, 1c, and 1d, which are stacked together in flush conforming relation, so that the central hinge member 1d is rotatable with respect to 1b and 1c about the core 1a. The outer cylindrical surfaces of 1b and 1c are screwed in fixed tangential relation along the opposite angular inner walls of bearing member 2.

The block 6 is superposed over the block 9, the internal angular surfaces of bearing 3 contacting tangentially in rotatable relation the outer surfaces of hinge members 1b and 1c, and are being connected in fixed tangential relation to the outer surface of the hinge member 1d. Thus, when the block 6 is moved in angular relation to base member 9 in a vertical plane, the internal angular surfaces of bearing 3 rotate slideably around the surfaces of 1b and 1c; and 1d, which is rigidly fixed to block 6, rotates about core 1a between 1b and 1c.

At the other end of block 6, when in rest position, cylindrical bearing pin 5, which is 1 inch long and ⅝ inch in diameter, is seated in the bearing 4, with its cylindrical wall contacting in fixed tangential relation the angular walls of the latter.

A screw 25, having a cylindrical head, say, ¼ inch in diameter and projecting out ¼ inch, is screwed into the lateral surface near the lower edge of the sidewall of block 6, about 1¼ inch from the forward end. A pin 26, say, 3/32 inch in diameter, projects out ¼ inch from the corresponding sidewall of base block 9, ¼ inch above the lower surface, and 1¼ inch in from the forward end.

Figure 3A:
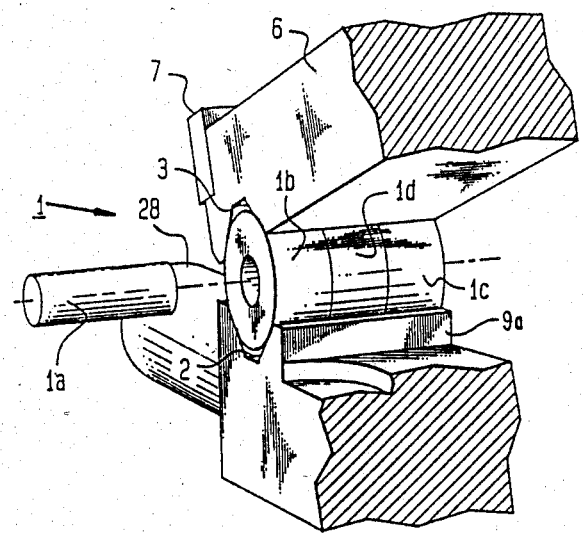
FIG. 3A is a detailed, enlarged showing of the hinge of FIG. 3.
Figure 3:
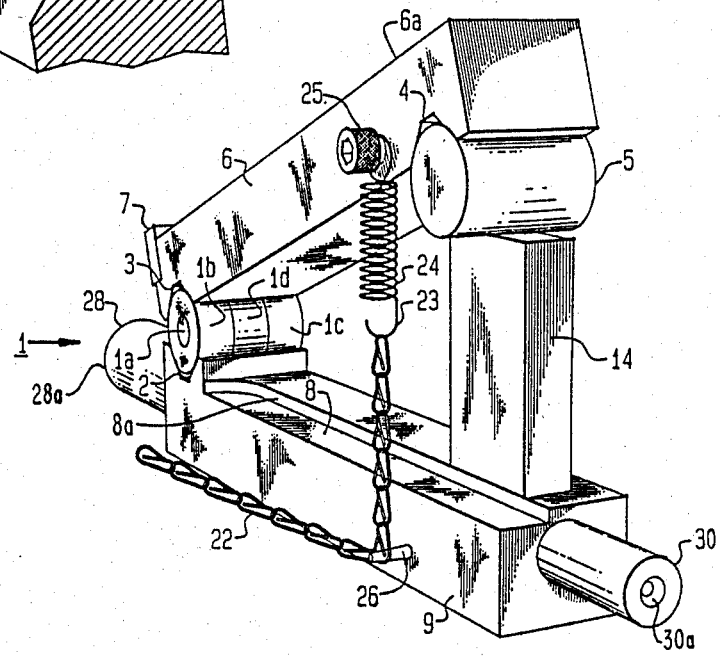
FIG. 3 is a perspective showing of the base and reference bars of the sine bar of FIG. 2, in open position against a gauge block, with the chain and spring connector fastened for holding the gauge block in position.

FIG. 3 shows the compound sine bar of the present invention in open position accommodating the rectangular gauge block 14, the base of which rests on the upper surface of 9, and the upper end of which makes tangential contact with the underside of the bearing pin 5.

The distance between the center of the pivot assemblage 1 and the center of the bearing pin 5, in its rest position as shown FIG. 2, is precisely measured to a preselected distance, say, 5 inches corresponding to the distance between the centers of bearing 3, and 4. This measurement is extrapolated to and precisely marked on the upper surface 6a of reference bar 6 to a tolerance +0.0002 inch.

Figure 1:
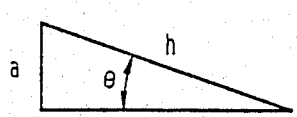
FIG. 1 is a diagram expositive of the principle of operation of the sine bar.

In a manner which is well-known, a suitable gauge block 14 is selected from a calibrated set of steel blocks of the type manufactured by HDT International, Inc., 15957 Minnesota Avenue, Paramount, Calif., 90723-4883, and illustrated in their Catalogue HDT 5-83. The surfaces of these blocks are flat and heights are carefully calibrated to within 0.0002 of an inch in order to precisely measure the angle formed by the open sine bar 10 by the well-known formula shown in FIG. 1, namely, sine $O = a/h$, where "a" is the vertical height of the gauge block, and "h" is the length of the hypotenuse.

When the bearing pin 5 is in place resting against the upper surface of gauge block 14, it is secured from falling out by means of the spring and chain arrangement comprising the coil spring 24, one end of which is fixed to the screw 25, and the hook end 23, which is fastened to chain 22, one of the links of which is locked on the pin 26, maintaining the block 14 under a slight compression.

FIGS. 4, 5, 6, and 7 illustrate the use of the compound sine bar 1 of the present invention for setting up a lathe and lathe compound for machining a workpiece to a precise angle.

Figure 4:
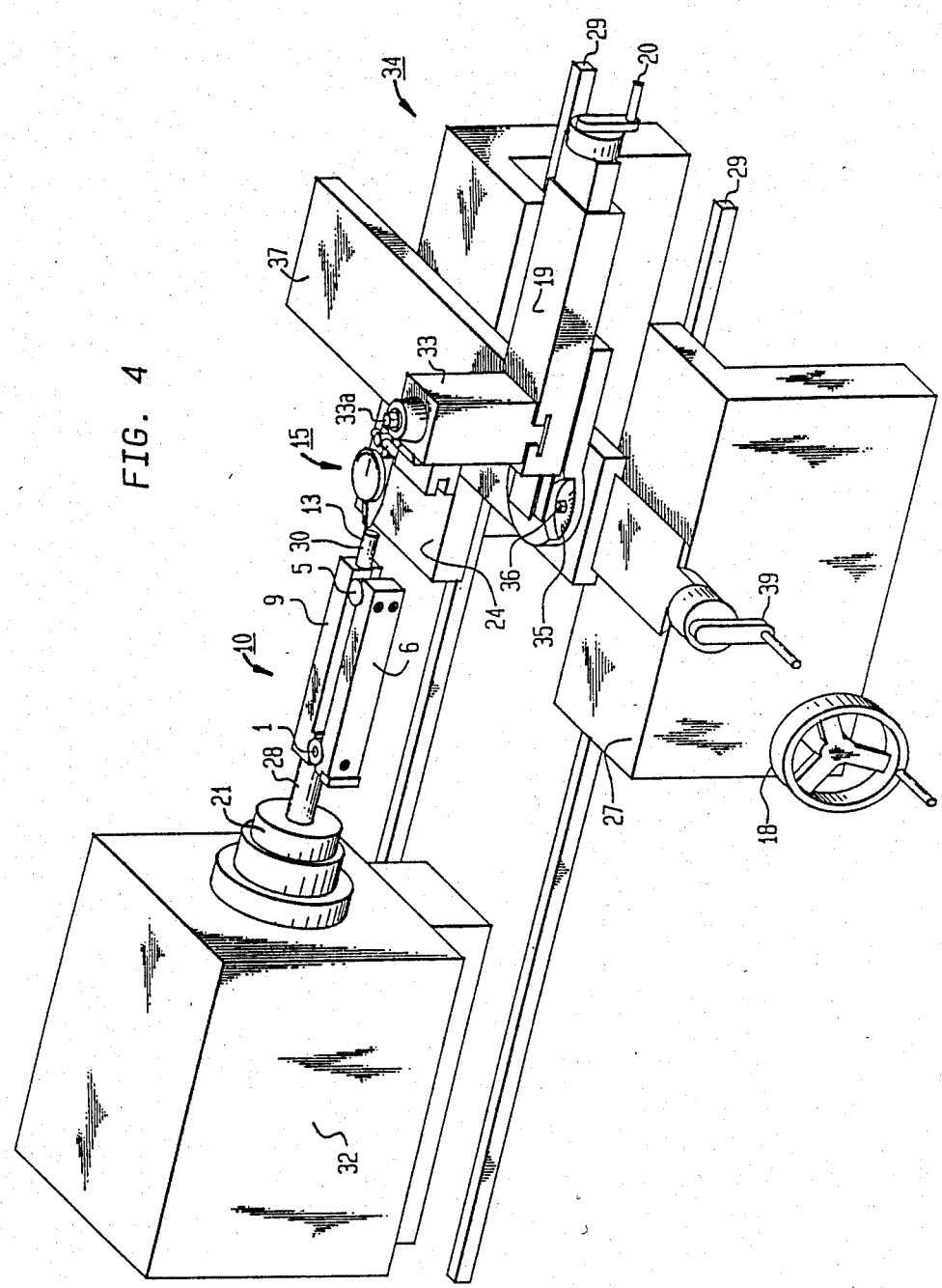
FIG. 4 shows the compound sine bar of the present invention with the headstock connecting shaft mounted in the collet of a lathe, and an indicator mounted in the tool holder in the process of orienting the sine bar to a desired angle.

Referring to FIG. 4, there is shown a conventional lathe carriage 34 which, for the purposes of illustration, may be of the general form of the Harrison M300 13" swing lathe, which is manufactured for REM SALES, Incorporated, a subsidiary of The Robert E. Morris Company, West Hartford, Conn., 06107, and is described in their Catalogue 5M-2-82. The disclosed device operates at from 40-2500 RPM, has a 3 Horsepower TEFC Motor Drive, a 4" camlock spindle, with a 1½ inch bore, and a universal gearbox for inch or metric threads.

The motor and gearing mechanism is included in a headstock housing 32, projecting from one lateral wall of which is a spindle, coaxial with which is a collet 21, into which is inserted the headstock connector rod 28 of the compound sine bar of the present invention. The spindle, including the compound sine bar, is then rotated to a desired position.

Figures 5, 6:
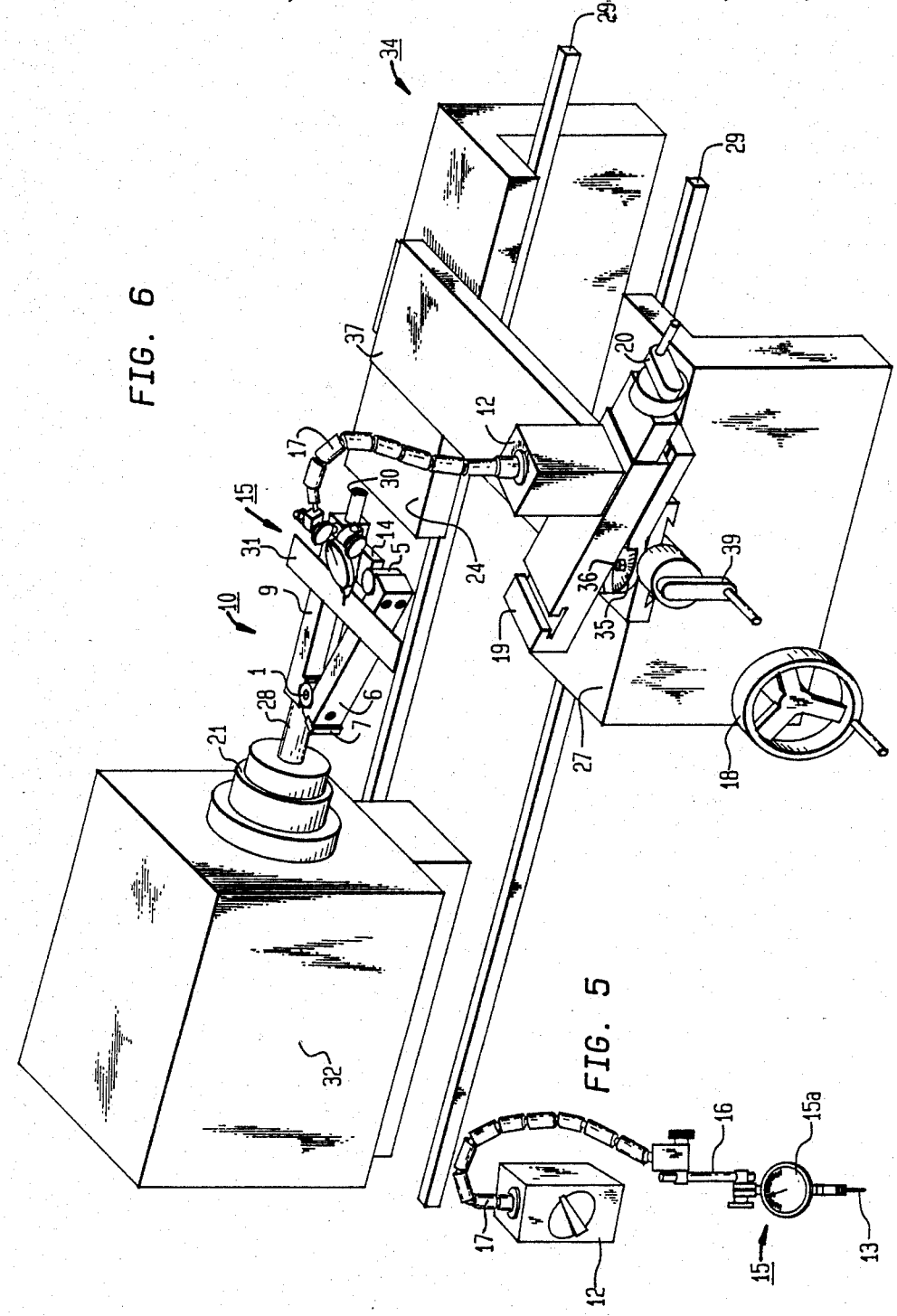
FIG. 5 shows the indicator assemblage attached to the magnetic flexible holder, for use with the sine bar of the present invention.
FIG. 6 shows the set-up for checking the horizontal alignment of the sine bar of the present invention with the cross-slide on the lathe carriage.
Figure 7:
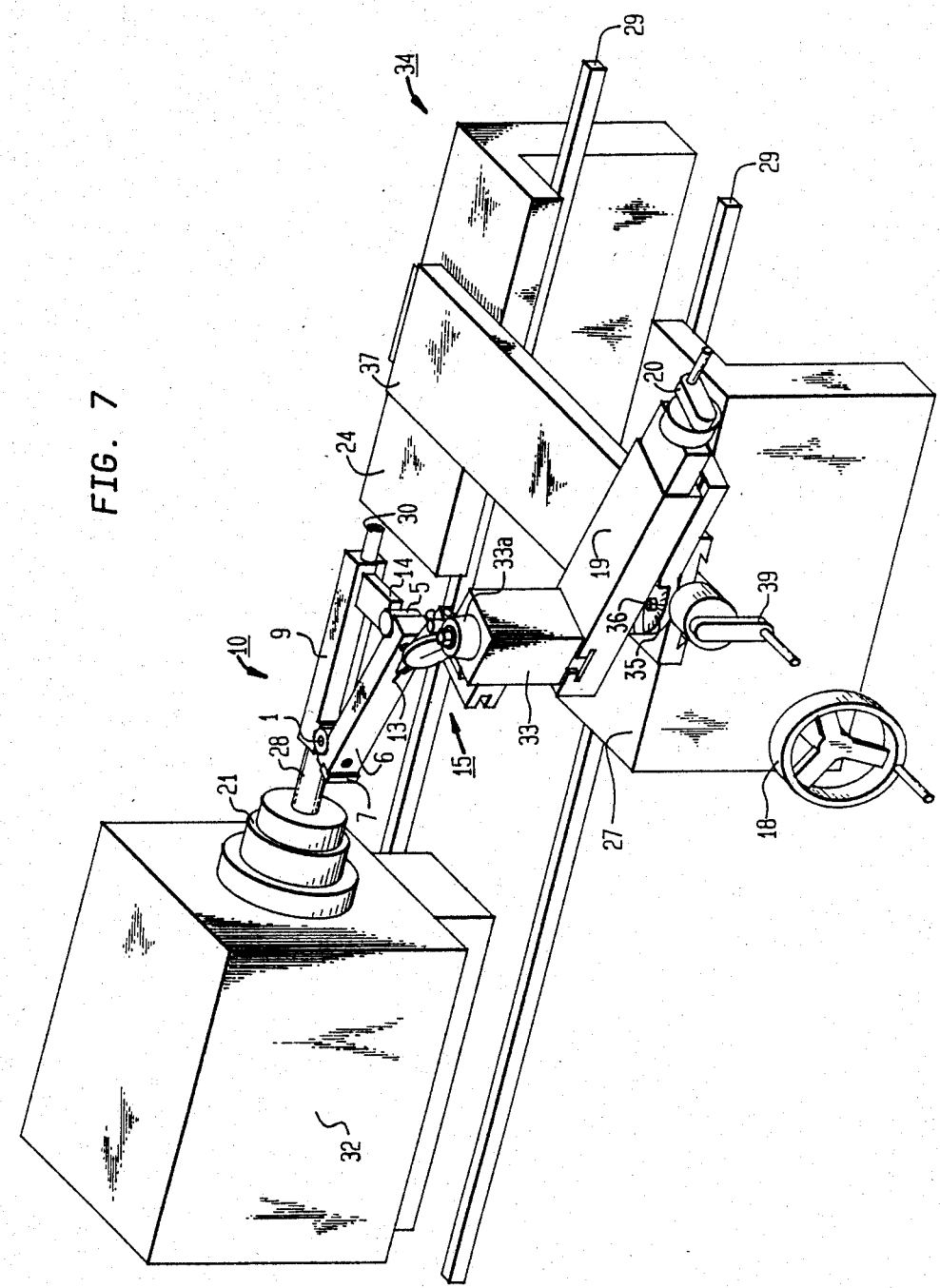
FIG. 7 shows the set-up for checking the parallel alignment between the reference bar of the sine bar of the present invention and the compound slide of the lathe.

FIG. 5 shows an indicator assemblage 15 which is utilized to determine whether a surface is flat, and to determine if two surfaces are parallel. This may be, for example, of a type manufactured by Swiss Precision Instruments of Carlstadt, N.J., and illustrated on page 98 of their 1984 Catalogue under the trademark TESTAST. The device used for measurements in accordance with the present invention is equipped with a dial 15a, say, one inch in diameter having a pointer which moves through a series of graduations equal to 0.0005 inch, indicating a range of 0.03 inch. The gauge 15 is equipped with a ⅜ inch long contact point or probe 13, which is designed to move over the test surface and communicate changes in surface elevation to the inner mechanism for recording on the dial 15a. Rigidly connected to the housing of gauge 15, diametrically opposite the pointer 13, is a rigid connecting rod 16, which, depending on the measurement being made, can be used to clamp the gauge 15 in a desired position on the lathe or lathe compound.

For example, for the initial positioning of the compound sine bar in the collet 21 of the lathe, the rod 16 of indicator 15 is fastened to the tool post 33a of tool holder 33, so that the contact point or probe 13 touches the tailstock extension 30 of the compound sine bar.

Once the compound sine bar is disposed so that it is rotating accurately with the spindle (exhibiting no runout), as indicated by no observable motion of the pointer of gauge 15 on the dial 15a, then the compound sine bar is ready to be opened up to provide an angular measurement.

One or more gauge blocks 14 of the desired lengths are selected from a calibrated set, and interposed with opposite ends resting flush between the inner surface of block 9 and a tangential contact with the bearing rod 5. In order to keep the gauge block(s) 14 in place, the spring and chain arrangement 22-24 is applied as shown in FIG. 3, with the upper end of coil spring 24 being fastened securely on nut 25. One end of the chain 22 is connected to hook 23 of the coil spring, and a portion of chain 22 is stretched taut with one of the links fastened around pin 26. This maintains the gauge block(s) 14 under slight pressure beneath the bearing pin 5, and keeps them from falling out.

A precision flatstock bar 31 having major surfaces parallel to a tolerance of 0.0002 inch, is then placed across the uppermost surfaces of base member 9 and reference bar 6, as shown in FIG. 6. The indicator 15 is mounted with its connecting rod 16 clamped to the flexible neck 17 of a magnetic flexible indicator holder which has a rectangular magnetic block base 21. (See FIG. 5). The latter base is mounted on the top surface of the compound slide 19 of the lathe.

The contact probe 13 of indicator 15 is then moved across the surface of parallel flatstock bar 31 vis a vis the cross slide 37, to make sure the uppermost surface of the reference bar 6 is parallel with the machine bed 29.

The sine bar of the present invention is thus set-up. The compound slide 19 is then turned manually through the desired angle until it appears visually to match as closely as possible the angle of the reference surface 6a of the compound sine bar.

The tool holder 33 is then firmly mounted in the slot on compound slide bar 19. The connecting rod 16 of indicator 15 is fixed in tool post 33a, and the indicator contact probe 13 is moved slideably over the reference surface 6a manually, and then using the compound slide 19, which is manipulated by hand wheel 20. When the pointer of indicator 15 fails to show any visible movement, the operator is aware that the slide bar 19 is rotated to the proper angle, where it is fixed by the screw 36 on dial 35. Otherwise, continued readjustment and checking of the angular position of compound slide bar 19 is required until there is no observable motion of the needle of gauge 15.

Once the position of compound slide bar 19 is determined and fixed, the compound sine bar is removed from the lathe collet 21 and replaced by the workpiece to be machined.

Although application of the compound sine bar of the present invention has been described for use with a particular set-up for a lathe compound, it will be understood that it can be used in many different orientations on the lathes and with many other types of devices, such as with milling, surface grinding, and granite surface plates and similar applications in which the flat under surface of the base member can be accommodated.

Furthermore, by using the recess 8 for supporting a calibrated gauge block, instead of the uppermost surface of the base member 9, small angles can be measured which are not capable of measurement with prior-art types of sine bars.

It will be understood that the Applicant is not limited to to specific structures or applications described by way of illustration, but only by the scope of the appended claims.

What is claimed is:

1. A sine bar for precise measurement of angles for machining operations which comprises in combination:
    an elongated base member having a cross-section, providing at least two pairs of flat parallel surfaces spaced-apart by the thickness of the member;
    said base member terminating at opposite ends in a pair of oppositely-directed axially aligned shafts;
    bearing means included in at least one end of said base member;
    an elongated reference bar having at least two pairs of flat parallel surfaces spaced-apart by the thickness of the bar, constructed to be mounted in superposed relation and parallel to one pair of parallel surfaces of said base member;
    said reference bar having bearing means at opposite ends;
    a pivot comprising a hinge interposed at one end between the bearing means of said base member and the bearing means of said reference bar; and
    a cylindrical bearing pin interposed in the bearing means at the other end of said refernce bar, said bearing pin constructed to bear tangentially against the upper end of a gauge block which is interposed between said bearing pin and a flat surface of said base member when said hinge is moved to open position between base member and said reference block.

2. The combination in accordance with claim 1 wherein said elongated base member and said reference bar are each rectangular in cross-section, and are mounted so that their sides are substantially coplanar.

3. The combination in accordance with claim 2 which comprises a spring-biased chain;
    means for fastening one end of said spring-biased chain to a lateral surface of said reference bar near the open end of said sine bar, and means for securing the other end of said spring-biased chain to a fastener on a substantially coplanar lateral surface of said base member.

4. The combination in accordance with claim 1 wherein said oppositely-directed axial shifts are slightly recessed at the centers to permit said sine bar to be supported by means applied to said centers.

5. The combination in accordance with claim 2 wherein the flat inner surface of said base member has an elongated recess of ¼ inch or less in height providing a flat surface along one edge extending from the outer end inward towards the hinge.

6. The combination in accordance with claim 1 wherein said hinge comprises a stationary element connected to one said elongated base member and said elongated reference bar, and an element rotatable about said stationary element connected to the other said elongated base member and said elongated reference bar.

7. The method of setting an angle for machining a workpiece on a member bar of a lathe compound which comprises a lathe spindle terminating in a collet, utilizing a compound sine bar comprising an elongated base member having a rectangular cross-section providing at least two pairs of flat parallel surfaces spaced-apart by the thickness of the member, said elongated base member terminating at opposite ends in a pair of oppositely-directed axially-aligned shafts, an elongated reference bar having a rectangular cross-section providing at least two pairs of flat parallel surfaces spaced-apart by the thickness of the reference bar, pivot means comprising a hinge interposed between said base member and said reference bar at one end, and a bearing pin fastened beneath the other end of said reference bar, and disposed to tangentially contact said base member in the closed position of said compound sine bar; comprising the steps of:
    interposing one of the axially-aligned shafts adjacent the hinge of said compound sine bar into the collet of said lathe, orientating said sine bar so that said sine bar is disposed between a pair of substantially horizontal planes; and tightening said collet in fixed relation to said compound sine bar;
    interposing one or more gauge blocks of calibrated length(s) into the open end between said base member and said reference bar so that the top of said uppermost gauge block is in tangential relation to said bearing pin to provide a preselected calibrated angle between said base member and said reference bar;
    manipulating a member bar of said lathe compound into a position in which visual inspection indicates that the surface of said member bar is substantially parallel to the surface of said reference bar disposed at said preselected angle;
    checking the parallel relation between the member bar of said lathe and said reference bar with gauge means; and
    removing said compound sine bar from the collet of said lathe and interposing a workpiece to be machined at said preselected angle.

* * * * *